(12) United States Patent
Li et al.

(10) Patent No.: US 11,782,316 B2
(45) Date of Patent: Oct. 10, 2023

(54) LIQUID CRYSTAL DISPLAY PANEL, AND LIQUID CRYSTAL DISPLAY DEVICE

(71) Applicant: BOE TECHNOLOGY GROUP CO., LTD., Beijing (CN)

(72) Inventors: Hui Li, Beijing (CN); Xinyin Wu, Beijing (CN); Yong Qiao, Beijing (CN); Jianbo Xian, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/855,390

(22) Filed: Jun. 30, 2022

(65) Prior Publication Data
US 2022/0334425 A1    Oct. 20, 2022

Related U.S. Application Data

(63) Continuation of application No. 16/959,003, filed as application No. PCT/CN2019/125351 on Dec. 13, 2019, now Pat. No. 11,391,998.

(30) Foreign Application Priority Data

Jan. 4, 2019    (CN) .......................... 201920018611.7

(51) Int. Cl.
G02F 1/1339    (2006.01)
G02F 1/1362    (2006.01)
G02F 1/1335    (2006.01)

(52) U.S. Cl.
CPC ...... *G02F 1/13394* (2013.01); *G02F 1/13396* (2021.01); *G02F 1/133512* (2013.01);
(Continued)

(58) Field of Classification Search
CPC ............... G02F 1/1339; G02F 1/13394; G02F 2001/13396; H01L 51/524; H01L 51/5246
See application file for complete search history.

(56) References Cited

U.S. PATENT DOCUMENTS

2003/0025868 A1    2/2003  Hiroshima et al.
2004/0201815 A1*  10/2004 Yamamoto ........ G02F 1/133371
                                                                349/156
(Continued)

FOREIGN PATENT DOCUMENTS

CN    102360137 A    2/2012
CN    102998851 A    3/2013
(Continued)

OTHER PUBLICATIONS

Office Action of U.S. Appl. No. 16/959,003 issued by the USPTO dated Nov. 23, 2021.
(Continued)

*Primary Examiner* — Jonathan Y Jung
(74) *Attorney, Agent, or Firm* — IP & T GROUP LLP

(57) ABSTRACT

A liquid crystal display panel includes an array substrate and an opposite substrate that are disposed opposite to each other; the liquid crystal display panel has a display region and at least one non-display region disposed beside the display region. The array substrate is of a multi-layer structure and includes a pixel electrode layer and a plurality of protrusions disposed in the at least one non-display region, and the opposite substrate includes a common electrode layer. A protrusion has a structure including at least one film, and a film of the at least one film is located in a layer included in the array substrate.

17 Claims, 9 Drawing Sheets

(52) U.S. Cl.
CPC .. *G02F 1/133514* (2013.01); *G02F 1/136209* (2013.01); *G02F 1/136222* (2021.01)

(56) References Cited

U.S. PATENT DOCUMENTS

| | | | | |
|---|---|---|---|---|
| 2004/0227895 | A1* | 11/2004 | Yoo | G02F 1/1339 |
| | | | | 349/152 |
| 2006/0209246 | A1* | 9/2006 | Kim | G02F 1/133377 |
| | | | | 349/155 |
| 2008/0002075 | A1* | 1/2008 | Yang | G02F 1/13394 |
| | | | | 349/187 |
| 2008/0318018 | A1* | 12/2008 | Segawa | G02B 5/003 |
| | | | | 428/220 |
| 2009/0103021 | A1* | 4/2009 | Manabe | G02F 1/13394 |
| | | | | 349/106 |
| 2009/0268145 | A1 | 10/2009 | Anjo et al. | |
| 2010/0309416 | A1* | 12/2010 | Gotoh | G02F 1/133514 |
| | | | | 349/123 |
| 2013/0120231 | A1 | 5/2013 | Jo et al. | |
| 2013/0342782 | A1* | 12/2013 | Kim | G02F 1/13394 |
| | | | | 349/46 |
| 2016/0198585 | A1* | 7/2016 | Li | G02F 1/134309 |
| | | | | 29/830 |
| 2017/0052405 | A1 | 2/2017 | Yu et al. | |
| 2017/0285424 | A1 | 10/2017 | Kwak et al. | |
| 2018/0307070 | A1* | 10/2018 | Fujisawa | C09K 19/54 |
| 2021/0373374 | A1 | 12/2021 | Li et al. | |

FOREIGN PATENT DOCUMENTS

| | | |
|---|---|---|
| CN | 103105710 A | 5/2013 |
| CN | 104330922 A | 2/2015 |
| CN | 209543014 U | 10/2019 |
| KR | 20080023020 A | 3/2008 |

OTHER PUBLICATIONS

Notice of Allowance of U.S. Appl. No. 16/959,003 issued by the USPTO dated Mar. 16, 2022.

International Search Report and Written Opinion of International Application No. PCT/CN2019/125351 issued by the Chinese Patent Office dated Mar. 17, 2020.

\* cited by examiner

LIQUID CRYSTAL DISPLAY PANEL, AND LIQUID CRYSTAL DISPLAY DEVICE

CROSS-REFERENCE TO RELATED APPLICATIONS

This application is a continuation of U.S. Ser. No. 16/959,003, filed on Jun. 29, 2020, which claims priority to International Patent Application No. PCT/CN2019/125351 filed on Dec. 13, 2019, which in turn claims priority to Chinese Patent Application No. 201920018611.7 filed on Jan. 4, 2019, which are incorporated herein by reference in their entirety.

TECHNICAL FIELD

The present disclosure relates to the field of liquid crystal display technologies, and in particular, to a liquid crystal display panel, and a liquid crystal display device.

BACKGROUND

Liquid crystal display (LCD) devices have been widely used due to advantages such as low power consumption, small in size, and light and thin.

SUMMARY

In one aspect, a liquid crystal display panel is provided. The liquid crystal display panel includes an array substrate and an opposite substrate that are disposed opposite to each other; the liquid crystal display panel having a display region and at least one non-display region disposed beside the display region. The array substrate is of a multi-layer structure and includes a pixel electrode layer and a plurality of protrusions disposed in the at least one non-display region, and the opposite substrate includes a common electrode layer. A protrusion has a structure including at least one film, and a film of the at least one film is located in a layer included in the array substrate.

In some embodiments, a shape of the protrusion includes at least one of a cylindrical, a frustum of a cone, a prism or a frustum of a pyramid.

In some embodiments, shapes of the plurality of protrusions are the same or not completely the same.

In some embodiments, the film of the at least one film is located in the pixel electrode layer.

In some embodiments, the array substrate further includes a pixel circuit structure disposed on a side of the pixel electrode layer away from the opposite substrate. The pixel circuit structure includes a gate electrode layer, a gate insulating layer, an active layer and a source-drain electrode layer. The film of the at least one film is located in a layer of the pixel circuit structure.

In some embodiments, the array substrate further includes a pixel circuit structure disposed on a side of the pixel electrode layer away from the opposite substrate. The pixel circuit structure includes a gate electrode layer, a gate insulating layer, an active layer and a source-drain electrode layer. The protrusion has a structure including two films, and a layer of the two films is located in the active layer, and another layer of the two films is located in the pixel electrode layer.

In some embodiments, the array substrate further includes a color filter layer disposed at a side of the pixel electrode layer proximate to or away from the opposite substrate, and the color filter layer includes color filter portions of at least two colors. The film of the at least one film is located in a color filter portion of a color among the color filter portions of at least two colors.

In some embodiments, the color filter portions of at least two colors includes at least a color filter portion of red color, and the film of the at least one film is located in the color filter portion of red color.

In some embodiments, a dimension of the protrusion in a direction from the array substrate to the opposite substrate is less than or equal to a dimension of the color filter layer in the direction from the array substrate to the opposite substrate.

In some embodiments, the opposite substrate further includes a plurality of grooves disposed in the at least one non-display region. Each protrusion of the plurality of protrusions is corresponding to a groove of the plurality of grooves, and the protrusion is matched with the corresponding groove.

In some embodiments, a shape of an end face of the protrusion proximate to the corresponding groove is the same as a shape of an opening of the corresponding groove proximate to the protrusion, and an area of the end face of the protrusion proximate to the corresponding groove is equal to or slightly greater than or slightly less than an area of the opening of the corresponding groove proximate to the protrusion.

In some embodiments, the plurality of protrusions are disposed in the at least one non-display region corresponding to one edge or more edges of the liquid crystal display panel.

In some embodiments, in the plurality of protrusions, shapes of protrusions in a non-display region corresponding to a same edge of the liquid crystal display panel are not completely the same; and/or, shapes of protrusions in non-display regions corresponding to different edges of the liquid crystal display panel are not completely the same.

In some embodiments, in the plurality of protrusions, protrusions in a non-display region corresponding to an edge of the liquid crystal display panel are arranged in at least one row. Protrusions in each row of the at least one row are sequentially arranged in an extending direction of the edge of the liquid crystal display panel corresponding to the non-display region in which the protrusions are disposed.

In some embodiments, a minimum distance between the protrusions and a boundary of the display region closest to the protrusion is greater than or equal to 5 μm.

In some embodiments, the liquid crystal display panel further includes a sealant disposed between the array substrate and the opposite substrate in the at least one non-display region. The plurality of protrusions are disposed at a side of the sealant proximate to the display region; or, the plurality of protrusions are disposed at a side of the sealant away from the display region.

In some embodiments, the array substrate further includes an over coat layer disposed on a side of the pixel electrode layer proximate to the opposite substrate. The film of the at least one film is located in the over coat layer.

In some embodiments, the opposite substrate further includes a second base substrate and a first black matrix pattern disposed at a side of the second base substrate proximate to the array substrate in the at least one non-display region. At least one part of the first black matrix pattern forms the plurality of grooves.

In some embodiments, the opposite substrate further includes a second base substrate and a color filter layer disposed on a side of the second base substrate proximate to the array substrate, and the color filter layer includes color filter portions of at least two colors. The plurality of grooves are located in a color filter portion of a color among the color filter portions of at least two colors.

In another aspect, a liquid crystal display device is provided. The liquid crystal display device includes the liquid crystal display panel provided in some embodiments described above, and a backlight module configured to provide light for the liquid crystal display panel.

BRIEF DESCRIPTION OF THE DRAWINGS

In order to describe technical solutions in the present disclosure more clearly, accompanying drawings to be used in some embodiments of the present disclosure will be introduced briefly. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products involved in the embodiments of the present disclosure.

DETAILED DESCRIPTION

Figure 1A:
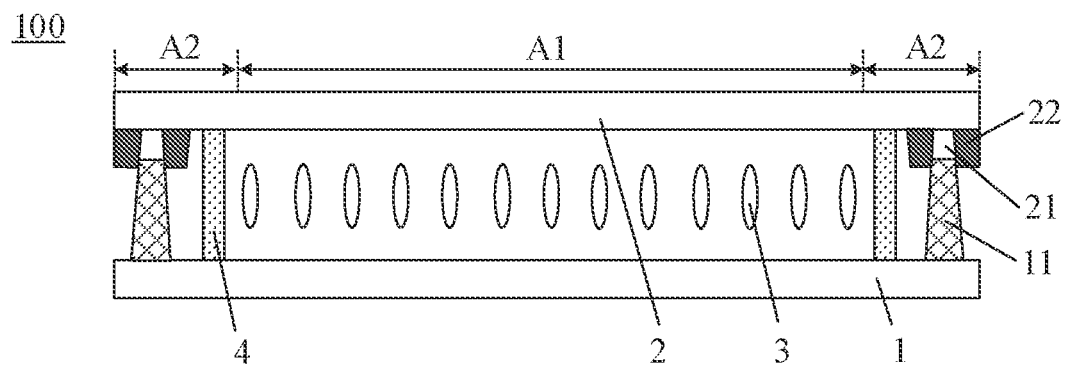
FIG. 1A is a cross-sectional view showing a structure of a liquid crystal display panel, according to some embodiments of the present disclosure.

Technical solutions in some embodiments of the present disclosure will be described clearly and completely with reference to accompanying drawings. Obviously, the described embodiments are merely some but not all of the embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open-ended and inclusive meaning, i.e., "included, but not limited to". In the description of the specification, terms such as "one embodiment", "some embodiments", "exemplary embodiments", "example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment or example. In addition, the specific features, structures, materials or characteristics may be included in any one or more embodiments or examples in any suitable manner.

Terms such as "first" and "second" are only used for descriptive purposes and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a/the plurality of" means two or more unless otherwise specified.

"At least one of A, B, and C" has the same meaning as "at least one of A, B, or C", and both include the following combinations: only A, only B, only C, a combination of A and B, a combination of A and C, a combination of B and C, and a combination of A, B and C. Combinations included in "at least one of A, B, C, and D" may be referred to the above combinations.

"A and/or B" includes the following three combinations: only A, only B, and a combination of A and B.

In the related art, a liquid crystal display device generally includes an array substrate and an opposite substrate that are disposed opposite to each other, and a liquid crystal layer disposed between the array substrate and the opposite substrate. In a process of aligning the array substrate and the opposite substrate to form a liquid crystal display device, or in a process of using the liquid crystal display device, there is a problem of a poor fit between the array substrate and the opposite substrate, that is, there is a misalignment between the array substrate and the opposite substrate, which are not aligned according to a preset position, and the display quality of the liquid crystal display device is reduced. For example, with respect to a liquid crystal display device with touch function, when the liquid crystal display device is pressed, a misalignment phenomenon may occur between the array substrate and the opposite substrate in the liquid crystal display device, resulting in a reduction in the fit between the array substrate and the opposite substrate, which further leads to a reduction in the display quality of the liquid crystal display device.

Figure 1B:
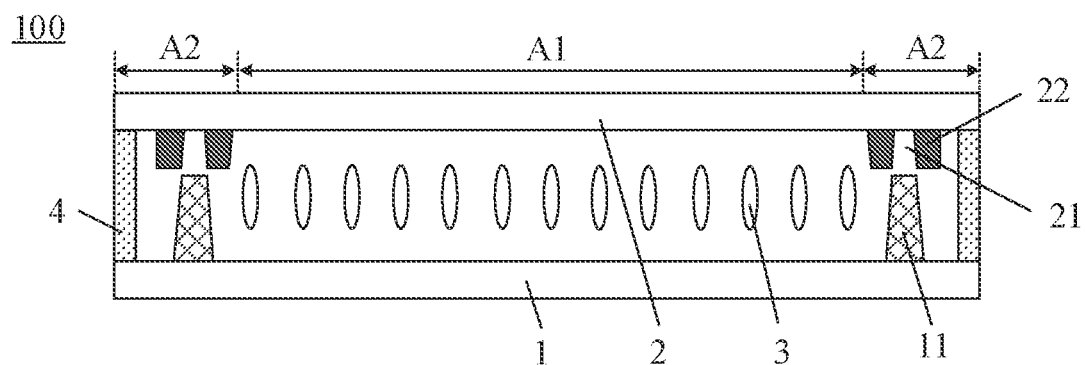
FIG. 1B is a cross-sectional view showing a structure of another liquid crystal display panel, according to some embodiments of the present disclosure.

On this basis, some embodiments of the present disclosure provide a liquid crystal display panel 100. As shown in FIGS. 1A and 1B, the liquid crystal display panel 100 includes a first substrate 1 and a second substrate 2 that are disposed opposite to each other. In some examples, the liquid crystal display panel 100 further includes a liquid crystal layer 3 disposed between the first substrate 1 and the second substrate 2.

In some embodiments, the liquid crystal display panel 100 has a display region A1 and at least one non-display region A2 disposed beside the display region A1.

The liquid crystal display panel 100 has a plurality of structures.

Figure 5:
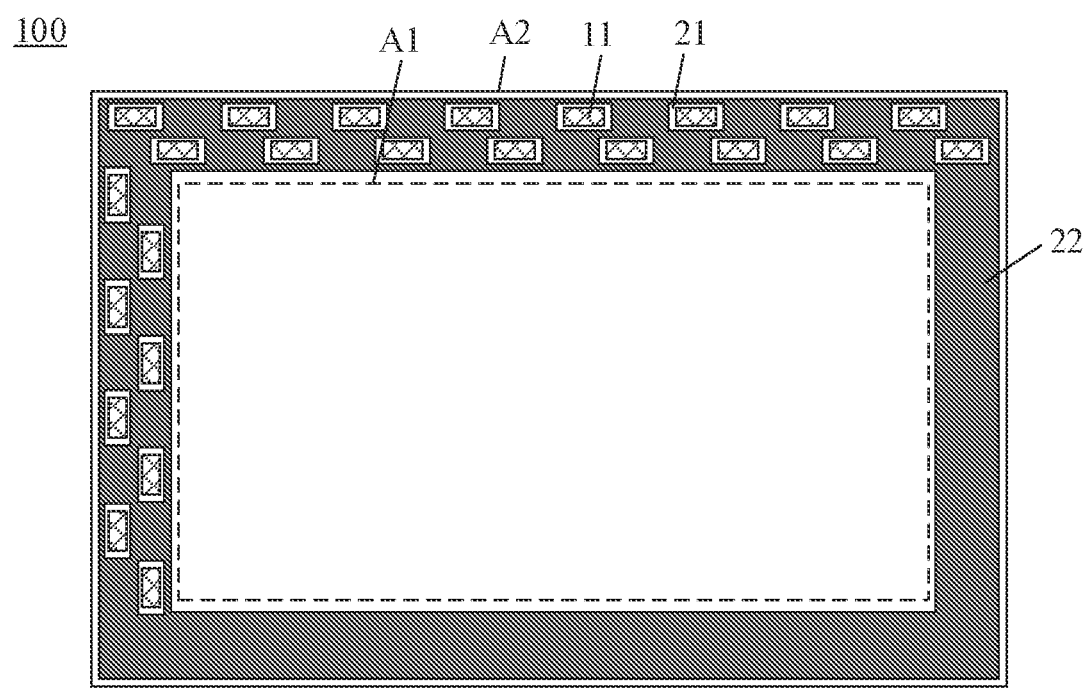
FIG. 5 is a top view showing a structure of yet another liquid crystal display panel, according to some embodiments of the present disclosure.
Figure 6:
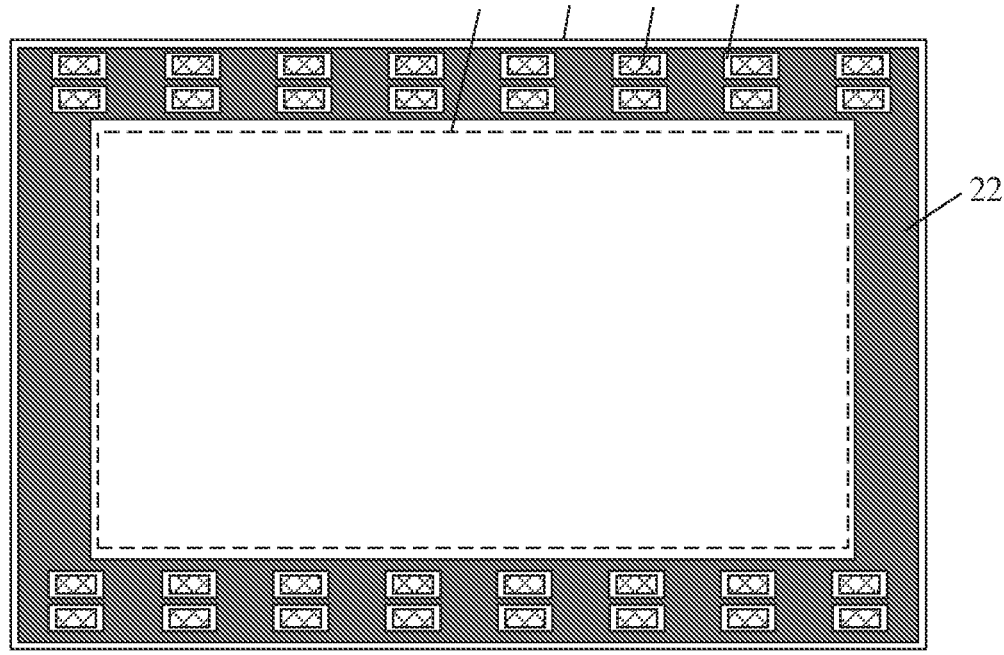
FIG. 6 is a top view showing a structure of yet another liquid crystal display panel, according to some embodiments of the present disclosure.
Figure 7:
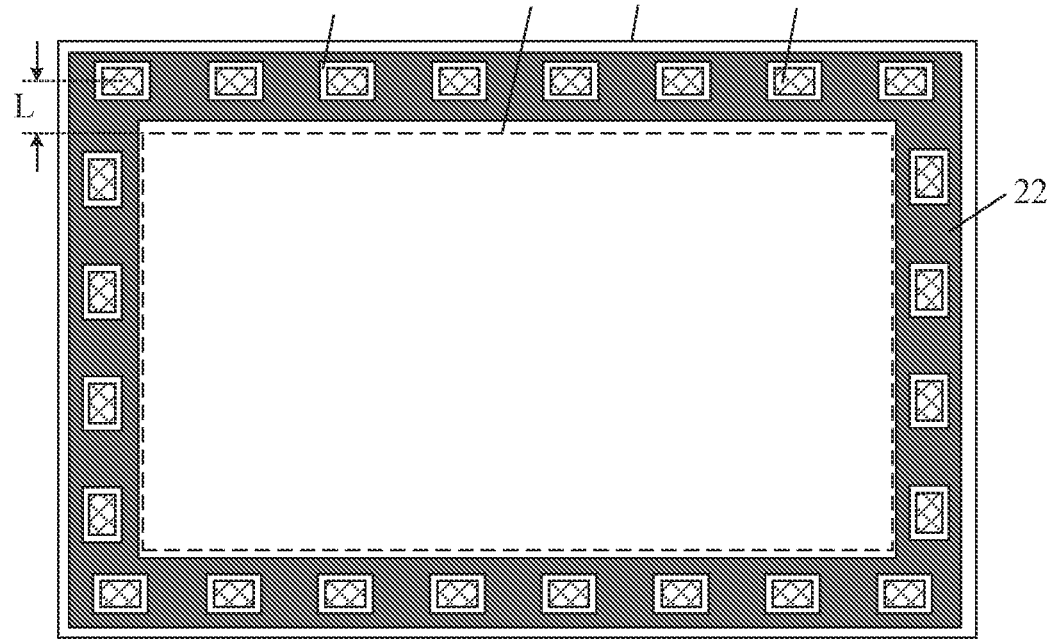
FIG. 7 is a top view showing a structure of yet another liquid crystal display panel, according to some embodiments of the present disclosure.

In some examples, as shown in FIGS. 5 to 7, a periphery of the liquid crystal display panel 100 is provided with a bezel, and the bezel is located in the non-display regions A2. That is, the non-display regions A2 are disposed at the periphery of the display region A1 and surround the display region A1.

Figure 2:
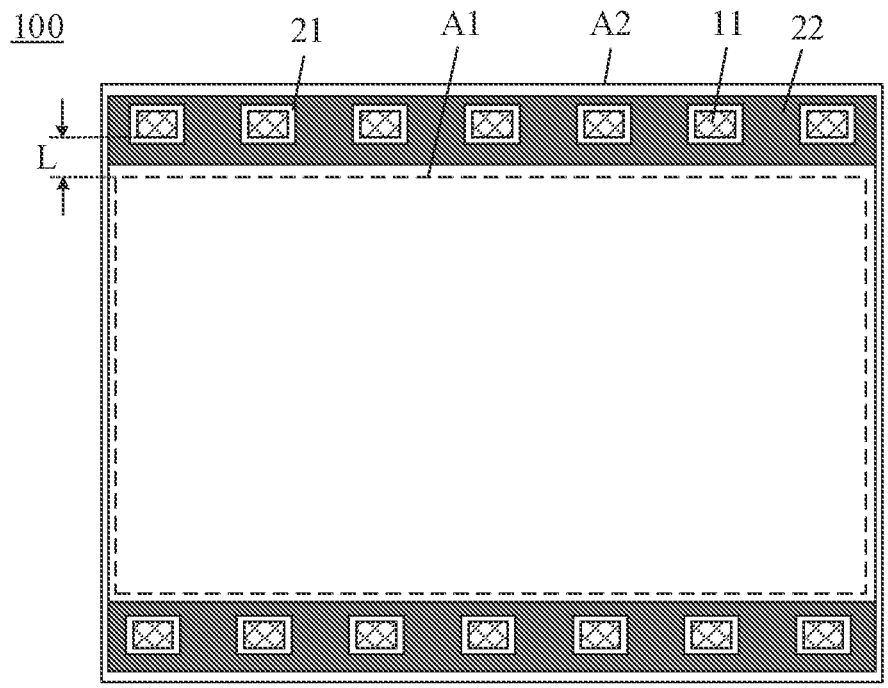
FIG. 2 is a top view showing a structure of a liquid crystal display panel, according to some embodiments of the present disclosure.
Figure 3:
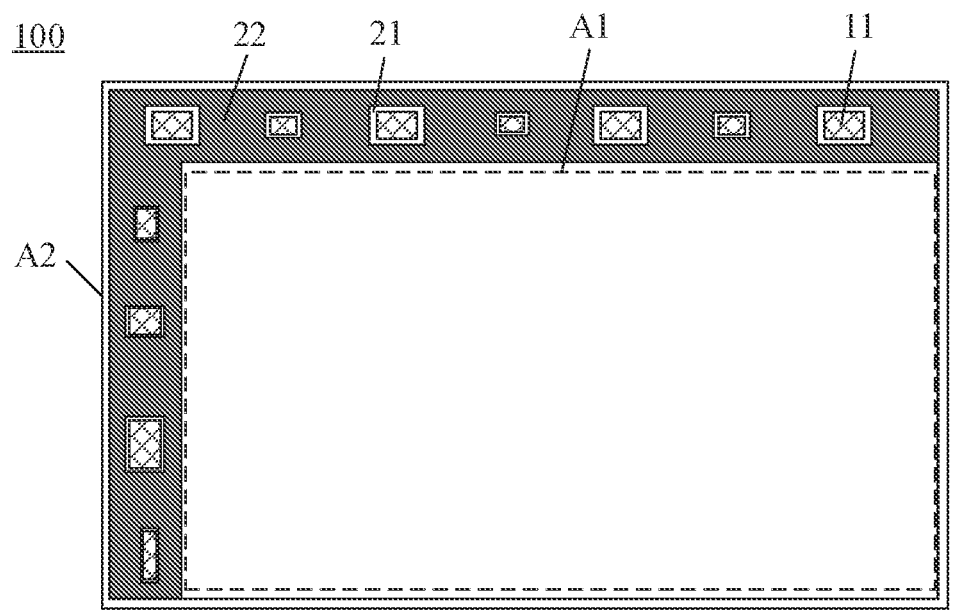
FIG. 3 is a top view showing a structure of another liquid crystal display panel, according to some embodiments of the present disclosure.
Figure 4:
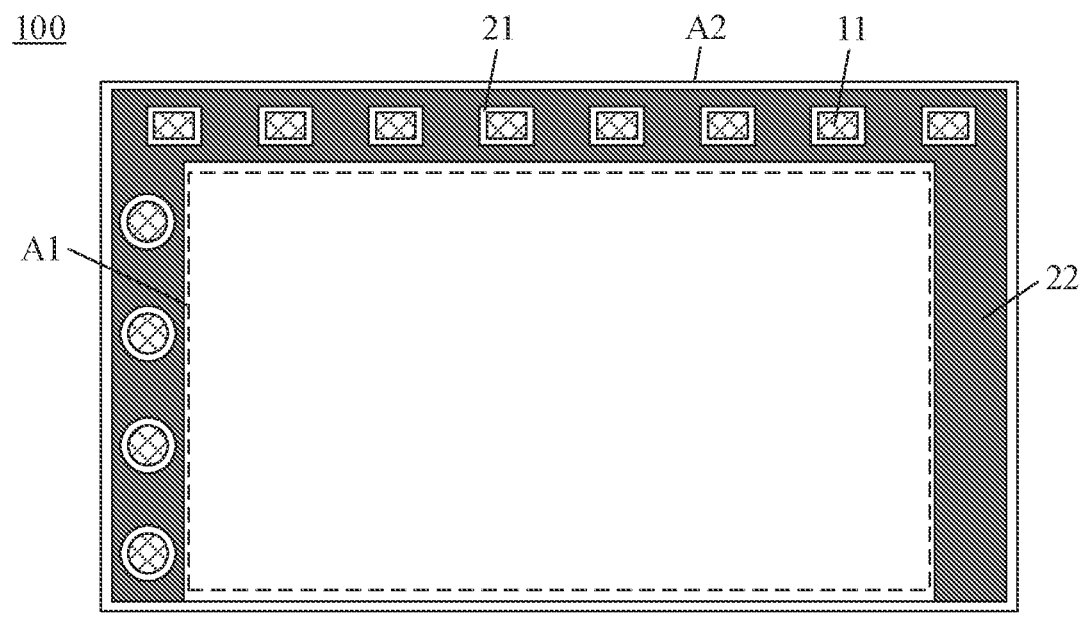
FIG. 4 is a top view showing a structure of yet another liquid crystal display panel, according to some embodiments of the present disclosure.

In some other examples, as shown in FIGS. 2 to 4, a part of the periphery of the liquid crystal display panel 100 is provided with a bezel, and another part is bezel-free. That is, at least one non-display region A2 is disposed at a part of the periphery of the display region A1 and does not surround the display region A1. As shown in FIG. 2, the non-display regions A2 are disposed at two opposite sides of the display region A1. As shown in FIG. 3, the non-display regions A2 are disposed at two adjacent sides of the display region A1. As shown in FIG. 4, the non-display regions A2 are disposed at three sides of the display region A1.

In some embodiments, one of the first substrate 1 and the second substrate 2 includes a plurality of protrusions 11 disposed in the non-display region(s) A2, and the other of the first substrate 1 and the second substrate 2 includes a plurality of grooves 21 disposed in the non-display region(s) A2. That is, if the first substrate 1 includes the plurality of protrusions 11 disposed in the non-display region(s) A2, the second substrate 2 includes the plurality of grooves 21 disposed in the non-display region(s) A2; if the second substrate 2 includes the plurality of protrusions 11 disposed in the non-display region(s) A2, the first substrate 1 includes the plurality of grooves 21 disposed in the non-display region(s) A2.

As shown in FIGS. 1A and 1B, in an example where the first substrate 1 includes the plurality of protrusions 11 located in at least one non-display region A2 and the second substrate 2 includes a plurality of grooves 21 located in the at least one non-display region A2, a structure of the liquid crystal display panel 100 and structures of the plurality of protrusions 11 and the plurality of grooves 21 will be illustrated below.

In some examples, each protrusion 11 of the plurality of protrusions 11 is corresponding to one groove 21 of the plurality of grooves 21, and each protrusion 11 is matched with a corresponding groove 21, so that each protrusion 11 can be inserted into the corresponding groove 21. Herein, "a corresponding groove 21" refers to a groove 21 that opposite to each protrusion 11 in a direction from the first substrate 1 direct to the second substrate 2.

Herein, each protrusion 11 of the plurality of protrusions 11 is corresponding to one groove 21 of the plurality of grooves 21, which includes a variety of arrangement manners. In some examples, the number of the plurality of protrusions 11 is the same as the number of the plurality of grooves 21, and the plurality of protrusions 11 are disposed in one-to-one correspondence with the plurality of grooves 21 (that is, one protrusion 11 corresponds to one groove 21). In some other examples, the number of the plurality of protrusions 11 is less than the number of the plurality of grooves 21, and the plurality of protrusions 11 are disposed in one-to-one correspondence with some grooves 21 that is a part of the plurality of grooves 21.

The number of the plurality of protrusions 11 and the number of the plurality of grooves 21 may be set according to actual needs.

In some examples, each protrusion 11 is matched with a corresponding groove 21, which includes: in the matched protrusion 11 and groove 21, a shape of an end face of the protrusion 11 proximate to the groove 21 is the same as a shape of an opening of the groove 21 proximate to the protrusion 11, and an area of the end face of the protrusion 11 proximate to the groove 21 is equal to or slightly greater than or slightly less than an area of the opening of the groove 21 proximate to the protrusion 11.

Thus, with respect to a groove 21 corresponding to each protrusion 11, both the shape and the area of the opening of the groove 21 proximate to the protrusion 11 may be designed according to both the shape and the area of the end face of the protrusion 11 proximate to the corresponding groove 21.

For example, as shown in FIG. 2, the shape of the end face of the protrusion 11 proximate to the corresponding groove 21 is a rectangle, and the shape of the opening of the groove 21, which corresponds to the protrusion 11, proximate to the protrusion 11 is a rectangle, and areas of the two rectangles are equal or approximately equal. For another example, as shown in FIG. 4, the shape of the end face of the protrusion 11 proximate to the corresponding groove 21 is a circle, and the shape of the opening of the corresponding groove 21 proximate to the protrusion 11 is a circle, and areas of the two circles are equal or approximately equal.

Since the shape of the end face of the protrusion 11 proximate to the corresponding groove 21 is the same as the shape of the opening of the corresponding groove 21 proximate to the protrusion 11, in a case where the area of the end face of the protrusion 11 proximate to the corresponding groove 21 is equal to or slightly less than the area of the opening of the corresponding groove 21 proximate to the protrusion 11, the protrusion 11 may be easily inserted into the corresponding groove 21 to limit movements of the first substrate 1 and the second substrate 2 in a direction parallel to a display surface of the liquid crystal display panel 100. In addition, in a case where the area of the end face of the protrusion 11 proximate to the corresponding groove 21 is slightly greater than the area of the opening of the corresponding groove 21 proximate to the protrusion 11, due to elastic deformation of the protrusion 11 and/or the corresponding groove 21, the protrusion 11 may be stably inserted into the corresponding groove 21 to stably limit the movements of the first substrate 1 and the second substrate 2 in the direction parallel to the display surface of the liquid crystal display panel 100.

In the liquid crystal display panel 100 provided by the embodiments of the present disclosure, in a design that a plurality of protrusions 11 and the plurality of grooves 21 are provided and each protrusion 11 is matched with a corresponding groove 21, each protrusion 11 may be inserted into a groove 21 corresponding to the protrusion 11 so as to utilize cooperation of each protrusion 11 and a corresponding groove 21 to limit the movements of the first substrate 1 and the second substrate 2 in the direction parallel to the display surface of the liquid crystal display panel 100.

Therefore, in a process of using the liquid crystal display panel 100, for example, in a process of applying the liquid crystal display panel 100 to a touch liquid crystal display device and pressing the touch liquid crystal display device, the protrusion 11 can be inserted into the corresponding groove 21, so that the misalignment between the first substrate 1 and the second substrate 2 may be avoided, and the fit between the first substrate 1 and the second substrate 2 may be better, and therefore the display quality of the liquid crystal display panel 100 may be improved.

Moreover, in the process of aligning the first substrate 1 with the second substrate 2 to form the liquid crystal display panel 100, the protrusion 11 and the corresponding groove 21 may be used for alignment to improve the fit between the first substrate 1 and the second substrate 2 in the aligning process and to improve a product yield of the liquid crystal display panel 100.

Herein, a height of the protrusion 11 (i.e., a dimension of the protrusion 11 in the direction from the first substrate 1 direct to the second substrate 2) is not limited, as long as the protrusion 11 may be inserted into the groove 21 corresponding to the protrusion 11.

In some examples, as shown in FIG. 1B, in a case where the liquid crystal display panel 100 is not pressed, each protrusion 11 is not inserted into the groove 21 corresponding to the protrusion 11; in a case where the liquid crystal display panel 100 is pressed, each protrusion 11 can be inserted into the groove 21 corresponding to the protrusion 11. In this way, there is a larger movement margin between the first substrate 1 and the second substrate 2 in the direction from the first substrate 1 direct to the second substrate 2, and thus the liquid crystal display panel 100 may withstand a larger pressure.

In some other examples, as shown in FIG. 1A, in the case where the liquid crystal display panel 100 is not pressed, the protrusion 11 has been inserted into the groove 21 corresponding to the protrusion 11. In this way, the misalignment between the first substrate 1 and the second substrate 2 may be avoided in the process of pressing the liquid crystal display panel 100.

The plurality of protrusions 11 have a variety of shapes, which may be selected and set according to actual needs, and is not limited in the embodiments of the present disclosure. In some examples, the plurality of protrusions 11 include at least one of a protrusion having a shape as a cylindrical, a protrusion having a shape as a frustum of a cone, a protrusion having a shape as a prism, or a protrusion having a shape as a frustum of a pyramid. Herein, the protrusion having a shape as a prism includes a protrusion having a shape as a triangular prism, a protrusion having a shape as a quadrangular prism, or a protrusion having a shape as a pentagonal prism, etc., and the protrusion having a shape as a frustum of a pyramid includes a protrusion having a shape as a frustum of a triangular pyramid, a protrusion having a shape as a frustum of a rectangular pyramid, or a protrusion having a shape as a frustum of a pentagonal pyramid, etc.

In some examples, as shown in FIG. 2 and FIGS. 5 to 7, shapes of the plurality of protrusions 11 may be the same; or as shown in FIGS. 3 and 4, the shapes of the plurality of protrusions 11 may be different. A size of the plurality of protrusions 11 in the direction parallel to the display surface of the liquid crystal display panel 100 is not limited, as long as the plurality of protrusions can be disposed in the non-display region A2. As shown in FIG. 2, the size of the plurality of protrusions 11 in the direction parallel to the display surface of the liquid crystal display panel 100 may be the same, or as shown in FIG. 4, the size of the plurality of protrusions 11 in the direction parallel to the display surface of the liquid crystal display panel 100 may be different.

In some examples, as shown in FIGS. 1A and 1B, in a case where the plurality of protrusions 11 include protrusions having a shape as a frustum of a cone, an area of an end face of the protrusion having a shape as a frustum of a cone proximate to the corresponding groove 21 is less than an area of an end face of the protrusion having a shape as a frustum of a cone away from the corresponding groove 21. In a case where the plurality of protrusions 11 include protrusions having a shape as a frustum of a pyramid, an area of an end face of the protrusion having a shape as a frustum of a pyramid proximate to the corresponding groove 21 is less than an area of an end face of the protrusion having a shape as a frustum of a pyramid away from the corresponding groove 21. In this way, it is convenient to insert the protrusion having a shape as a frustum of a cone or the protrusion having a shape as a frustum of a pyramid into the corresponding groove 21. Moreover, considering an actual manufacturing process of the plurality of protrusions 11, for example, an etching process used to form the plurality of protrusions 11, in the process of forming the plurality of protrusions 11 through the etching process, a prior etching degree is greater than a latter etching degree, and thus the protrusion 11 having a shape as a frustum of a cone or the protrusion 11 having a shape as a frustum of a pyramid may be spontaneously formed.

In some embodiments, the plurality of protrusions 11 has a variety of arrangement manners. As shown in FIGS. 2 to 7, the plurality of protrusions 11 are disposed in at least one non-display region A2 corresponding to one or more edges of the liquid crystal display panel 100. Herein, one or more edges of the liquid crystal display panel 100 refers to one or more edges of the liquid crystal display panel 100 each having a non-display region A2.

By providing a plurality of protrusions 11 and a plurality of corresponding grooves 21 in the non-display region A2 corresponding to one edge of the liquid crystal display panel 100, the movements of the first substrate 1 and the second substrate 2 in the direction parallel to the display surface of the liquid crystal display panel 100 may be restricted, and the fit between the first substrate 1 and the second substrate 2 may be improved. By providing a plurality of protrusions 11 and a plurality of corresponding grooves 21 in the non-display regions A2 corresponding to more edges of the liquid crystal display panel 100, the movements of the first substrate 1 and the second substrate 2 in directions parallel to the display surface of the liquid crystal display panel 100 (i.e., directions perpendicular or substantially perpendicular to each edge) may be simultaneously restricted, and the fit between the first substrate 1 and the second substrate 2 may be effectively improved.

The liquid crystal display panel 100 has a variety of shapes. For example, a shape of the liquid crystal display panel 100 is a circle, a rectangle, a pentagon, etc.

An arrangement manner of the plurality of protrusions 11 will be illustrated below by taking an example in which the shape of the liquid crystal display panel 100 is a rectangle.

In some examples, the plurality of protrusions 11 may be disposed in the non-display region A2 corresponding to one edge of the liquid crystal display panel 100. In this way, the movements of the first substrate 1 and the second substrate 2 in the direction parallel to the display surface of the liquid crystal display panel 100 may be restricted, and the misalignment between the first substrate 1 and the second substrate 2 may be avoided.

In some other examples, as shown in FIGS. 3 to 5, the plurality of protrusions 11 may be disposed in the non-display regions A2 corresponding to two adjacent edges of the liquid crystal display panel 100. In this way, the movements of the first substrate 1 and the second substrate 2 in directions parallel to the display surface of the liquid crystal display panel 100 (i.e., directions perpendicular or substantially perpendicular to each edge) may be restricted, and the misalignment between the first substrate 1 and the second substrate 2 may be effectively avoided.

Herein, an arrangement of non-display region(s) A2 of the liquid crystal display panel 100 other than the non-display region(s) A2 where the protrusions 11 are disposed is not limited. For example, as shown in FIG. 3, the right edge and the lower edge of the liquid crystal display panel 100 do not correspond to non-display regions A2. For another example, as shown in FIG. 4, the right edge of the liquid crystal display panel 100 corresponds to a non-display region A2, and the lower edge of the liquid crystal display panel 100 does not correspond to a non-display region A2. For yet another example, as shown in FIG. 5, both the right edge and the lower edge of the liquid crystal display panel 100 correspond to non-display regions A2, respectively. For yet another example, as shown in FIG. 2, a left edge and a right edge of the liquid crystal display panel 100 do not correspond to non-display regions A2. For yet another example, as shown in FIG. 6, both the left edge and the right edge of the liquid crystal display panel 100 correspond to non-display regions A2.

In some other examples, as shown in FIGS. 2 and 6, the plurality of protrusions 11 may be disposed in the non-display regions A2 corresponding to two opposite edges of the liquid crystal display panel 100. In this way, the movements of the first substrate 1 and the second substrate 2 in directions parallel to the display surface of the liquid crystal display panel 100 (i.e., directions perpendicular or substantially perpendicular to each edge) may be restricted, and the misalignment between the first substrate 1 and the second substrate 2 may be effectively avoided. In addition, in the case where the liquid crystal display panel 100 is pressed, a stress on the liquid crystal display panel 100 may be balanced, which may avoid affecting the display effect of the liquid crystal display panel 100.

In some other examples, the plurality of protrusions 11 are disposed in the non-display regions A2 corresponding to three edges of the liquid crystal display panel 100. In this way, the misalignment between the first substrate 1 and the second substrate 2 may be further avoided, which may effectively avoid affecting the display effect of the liquid crystal display panel 100.

In some other examples, as shown in FIG. 7, the plurality of protrusions 11 may be disposed in the non-display regions A2 corresponding to four edges of the liquid crystal display panel 100 (i.e., each edge). In this way, the movements of the first substrate 1 and the second substrate 2 in each direction parallel to the display surface of the liquid crystal display panel 100 may be restricted, so as to ensure that a relative position between the first substrate 1 and the second substrate 2 substantially remains unchanged. In addition, in a case where the liquid crystal display panel 100 is pressed, the stress on the liquid crystal display panel 100 may be further balanced to ensure the display effect of the liquid crystal display panel 100.

There may be a variety of manners to set shapes of the protrusions 11 located in the non-display region A2 corresponding to an edge of the liquid crystal display panel 100 (i.e., an edge having a corresponding non-display region A2), which may be selected and set according to actual needs, and is not limited in some embodiments of the present disclosure.

In some examples, as shown in FIGS. 2 and 7, the shapes of the plurality of protrusions 11 located in the non-display regions A2 corresponding to each edge of the liquid crystal display panel 100 are completely the same. In this way, in the case where the liquid crystal display panel 100 is pressed, the stress on each protrusion 11 may be balanced, which may avoid affecting the display effect of the liquid crystal display panel 100.

In some other examples, as shown in FIG. 3, the shapes of the plurality of protrusions 11 located in the non-display region A2 corresponding to a same edge of the liquid crystal display panel 100 are not completely the same. For example, as shown in FIG. 3, the plurality of protrusions 11 located in the non-display region A2 corresponding to the lateral edge of the liquid crystal display panel 100 include protrusions 11 of two shapes, and the protrusions 11 of the two shapes are alternately arranged. In the plurality of protrusions 11 disposed in the non-display region A2 corresponding to the longitudinal edge of the liquid crystal display panel 100, each protrusion 11 has a different shape, and the protrusions 11 of various shapes are arranged in sequence.

In some other examples, the plurality of protrusions 11 are disposed in the non-display regions A2 corresponding to at least two edges of the liquid crystal display panel 100, and the shapes of the plurality of protrusions located in the non-display regions A2 corresponding to different edges of the liquid crystal display panel 100 are not completely the same. For example, as shown in FIG. 4, the shapes of the plurality of protrusions 11 located in the non-display region A2 corresponding to the same edge of the liquid crystal display panel 100 are completely the same, and the shapes of the plurality of protrusions 11 located in the non-display regions A2 corresponding to the longitudinal edge of the liquid crystal display panel 100 are different from the shapes of the plurality of protrusions 11 located in the non-display regions A2 corresponding to the lateral edge of the liquid crystal display panel 100. For another example, as shown in FIG. 3, in the plurality of protrusions 11 located in the non-display regions A2 corresponding to different edges of the liquid crystal display panel 100, shapes of at least two protrusions 11 are the same, and the at least two protrusions 11 are located in the non-display regions A2 corresponding to different edges; shapes of the other protrusions 11 located in the non-display regions A2 corresponding to the longitudinal edge of the liquid crystal display panel 100 are different from the shapes of the at least two protrusions 11.

In addition, the plurality of protrusions 11 located in the non-display regions A2 corresponding to different edges of the liquid crystal display panel 100 may be completely the same in shape, and not completely the same in size.

In some other embodiments, the arrangement manner of the protrusions 11 disposed in the non-display region A2 may be set according to actual needs, which is not limited in some embodiments of the present disclosure.

In some examples, the protrusions 11 disposed in the non-display region A2 corresponding to one edge of the liquid crystal display panel 100 are arranged in at least one row. Protrusions 11 in each row of the at least one row are sequentially arranged in an extending direction of the edge of the liquid crystal display panel 100 corresponding to the non-display region A2 in which the protrusions in each row of the at least one row are located.

For example, as shown in FIGS. 2 to 4, the protrusions 11 in the non-display region A2 corresponding to one edge of the liquid crystal display panel 100 are arranged in one row, and the protrusions 11 in the row are sequentially arranged in the extending direction of the edge of the liquid crystal display panel 100 corresponding to the non-display region A2 in which the protrusions in the row are located. For another example, as shown in FIGS. 5 and 6, the protrusions 11 in the non-display region A2 corresponding to one edge of the liquid crystal display panel 100 are arranged in two rows, and the protrusions 11 in each row of the two rows are sequentially arranged in the extending direction of the edge of the liquid crystal display panel 100 corresponding to the non-display region A2 in which the protrusions in each row of the two rows are located. For yet another example, the protrusions 11 in the non-display region A2 corresponding to one edge of the liquid crystal display panel 100 are arranged in two or more rows, and the protrusions 11 in each row of the two or more rows are sequentially arranged in the extending direction of the edge of the liquid crystal display panel 100 corresponding to the non-display region A2 in which the protrusions in each row of the two or more rows are disposed.

In a case where the protrusions 11 in the non-display region A2 corresponding to one edge of the liquid crystal display panel 100 are arranged in two or more rows, with respect to the protrusions 11 in the non-display region A2 corresponding to the same edge, as shown in FIG. 6, a plurality of protrusions 11 are arranged in an array; or, as shown in FIG. 5, the protrusions 11 in different rows are arranged in a staggered manner in a direction from the non-display region A2 direct to the display region A1.

In some embodiments, in a case where the protrusions 11 are provided in the non-display regions A2 corresponding to at least two edges of the liquid crystal display panel 100, and protrusions in the non-display region A2 corresponding to each edge of the liquid crystal display panel 100 are arranged in at least one row, the number of rows of the protrusions 11 disposed in the non-display regions A2 corresponding to different edges may be the same or different. For example, a plurality of protrusions 11 are provided in the non-display region A2 corresponding to the lateral edge of the liquid crystal display panel 100 and a plurality of protrusions 11 are provided in the non-display region A2 corresponding to the longitudinal edge of the liquid crystal display panel 100. The protrusions 11 provided in the non-display region A2 corresponding to the lateral edge are arranged in one row, and the protrusions 11 in the row are sequentially arranged in an extending direction of the lateral edge. The protrusions 11 provided in the non-display region A2 corresponding to the longitudinal edge are arranged in two rows, and the protrusions 11 in each row of the two rows are sequentially arranged in an extending direction of the longitudinal edge.

In addition, in the plurality of protrusions 11 located in the non-display region A2 corresponding to the same edge of the liquid crystal display panel 100, spacing between every two adjacent protrusions 11 is, for example, the same or different.

In some embodiments, as shown in FIG. 2, a minimum distance L between each protrusion 11 and a boundary of the display region A1 closest to the protrusion 11 is greater than or equal to 5 μm. Herein, as shown in FIG. 2, the minimum distance L refers to a distance between a position of each protrusion 11 closest to the boundary of the display region A1 and the boundary of the display region A1 in a direction from the non-display region A2 direct to the display region A1.

By defining the minimum distance between each protrusion 11 and the boundary of the display region A1 closest to the protrusion 11, in a process of manufacturing each protrusion 11 in the non-display region(s) A2, it may be ensured that each protrusion 11 can be formed in the non-display region(s) A2, and the protrusion 11 is prevented from being formed in the display region A1, thereby avoiding affecting a normal display of the display region A1.

In some embodiments, a liquid crystal layer 3 and a sealant 4 are formed at a side of one of the first substrate 1 and the second substrate 2, and then one of the first substrate 1 and the second substrate 2 is aligned with the other of the first substrate 1 and the second substrate 2. The sealant 4 is cured to form the liquid crystal display panel 100.

Thus, in some examples, as shown in FIGS. 1A and 1B, the liquid crystal display panel 100 further includes the sealant 4 that is disposed between the first substrate 1 and the second substrate 2 in the non-display region A2. The liquid crystal layer 3 is disposed in the display region A1. An orthographic projection of the sealant 4 on the second substrate 2 does not overlap with orthographic projections of the protrusions 11 on the second substrate 2.

There are a variety of arrangement relationships between the protrusions 11 and the sealant 4. For example, as shown in FIG. 1B, the protrusions 11 are located at a side of the sealant 4 proximate to the display region A1. In this case, a size of the sealant 4 in the direction parallel to the display surface of the liquid crystal display panel 100 may be set according to actual needs, as long as the first substrate 1 and the second substrate 2 can be well bonded together and the liquid crystal layer 3 can be prevented from spilling out from space between the first substrate 1 and the second substrate 2.

For another example, as shown in FIG. 1A, the protrusions 11 are disposed at a side of the sealant 4 away from the display region A1. In this way, in a case where the size of the sealant 4 in the direction parallel to the display surface of the liquid crystal display panel 100 is constant, a distance between the protrusion 11 and the sealant 4 may be designed to reduce a size of the non-display region A2.

In some embodiments, one of the first substrate 1 and the second substrate 2 is an array substrate 1', the other of the first substrate 1 and the second substrate 2 is an opposite substrate 2' paired with the array substrate 1'. That is, if the first substrate 1 is an array substrate 1', the second substrate 2 is an opposite substrate 2'. If the second substrate 2 is an array substrate 1', the first substrate 1 is an opposite substrate 2'.

In some examples of the present disclosure, the structure of the protrusion 11 has a structure including at least one film. The structure of the protrusion 11 will be illustrated by taking an example in which the array substrate 1' is of a multi-layer structure and includes the plurality of protrusions 11.

In some embodiments, as shown in FIGS. 8 to 15, the array substrate 1' further includes: a first base substrate 12, a pixel circuit structure 13 disposed on a side of the first base substrate 12 in the display region A1, and a pixel electrode layer 14 disposed at a side of the pixel circuit structure 13 proximate to the opposite substrate 2'. The pixel circuit structure 13 includes a gate electrode layer 131, a gate insulating layer 132, an active layer 133 and a source-drain electrode layer 134, and the source-drain electrode layer 134 includes a source electrode 1341 and a drain electrode 1342 disposed in a same layer.

Figure 8:
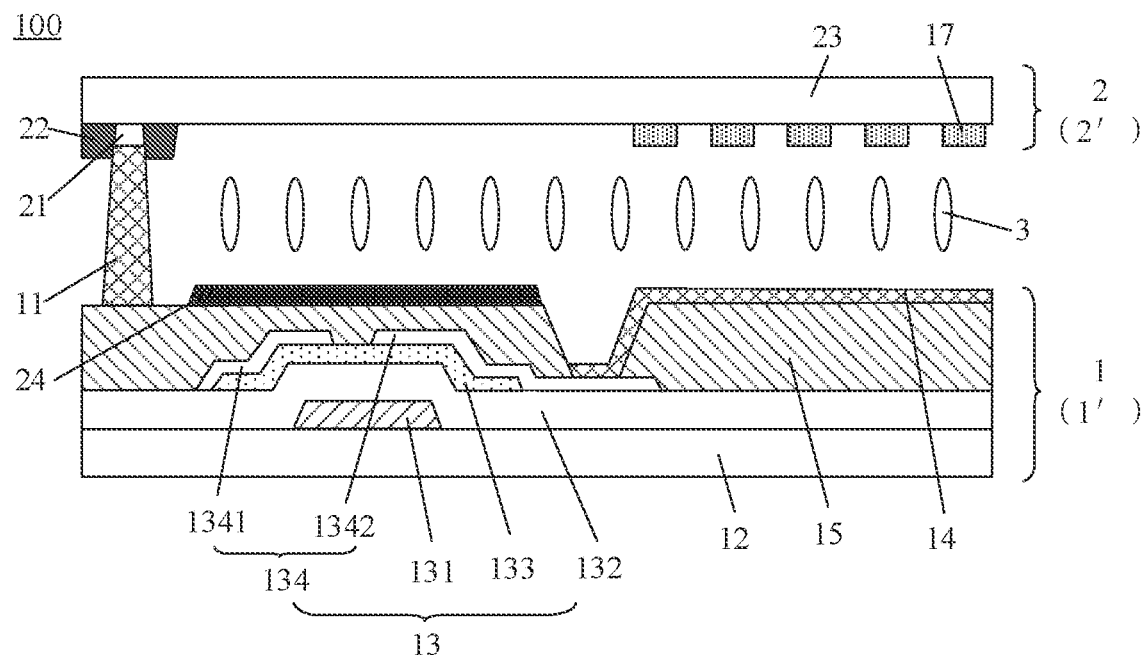
FIG. 8 is a partial cross-sectional view showing a structure of a liquid crystal display panel, according to some embodiments of the present disclosure.

A position relationship of the gate electrode layer 131, the gate insulating layer 132, the active layer 133 and the source-drain electrode layer 134 (the source-drain electrode layer 134 includes the source electrode 1341 and the drain electrode 1342 that are disposed in the same layer) is related to a structure of the pixel circuit structure 13. For example, the structure of the pixel circuit structure 13 is a bottom-gate structure, and the position relationship of the gate electrode layer 131, the gate insulating layer 132, the active layer 133 and the source-drain electrode layer 134 (the source-drain electrode layer 134 includes the source electrode 1341 and the drain electrode 1342 that are disposed in the same layer) is a position relationship as shown in FIG. 8. For example, the structure of the pixel circuit structure 13 is a top-gate structure, and the position relationship of the gate electrode layer 131, the gate insulating layer 132, the active layer 133 and the source-drain electrode layer 134 (the source-drain electrode layer 134 includes the source electrode 1341 and the drain electrode 1342 that are disposed in the same layer) is a position relationship where the active layer 133, the gate insulating layer 132, the gate electrode layer 131, an interlayer insulating layer and the source-drain electrode layer 134 are sequentially stacked. Herein, the interlayer insulating layer is an insulating layer that isolates the gate electrode layer 131 from the source-drain electrode layer 134.

The "same layer" herein refers to a layer structure, which is formed by forming a film layer for obtaining specific pattern(s) through a same film-forming process and then performing a single patterning process by utilizing a same mask. According to different specific patterns, a single patterning process may include multiple exposure, development or etching processes, and the specific patterns in the formed layer structure may be continuous or discontinuous, the specific patterns may be at different heights or have different thicknesses. In this way, patterns of a plurality of elements or components (e.g., source electrodes and drain electrodes) may be provided in the same layer without increasing the number of times of manufacturing the films, it is beneficial to reduce a thickness of the liquid crystal display panel 100 and simplify a manufacturing process of the liquid crystal display panel 100. The "same layer" mentioned below has the same meaning as the "same layer" described above.

Herein, "A is disposed in B layer" means that a pattern of the B layer includes a pattern of A. If the B layer further includes a pattern of C, the pattern of A and the pattern of C are disposed in the same layer. The "same layer" has the same meaning as the "same layer" described above.

Here, the structure of the protrusion 11 is, for example, a structure in which a film of the at least one film included in the protrusion 11 is in a layer of the pixel circuit structure 13 or in the pixel electrode layer 14.

Figure 9:
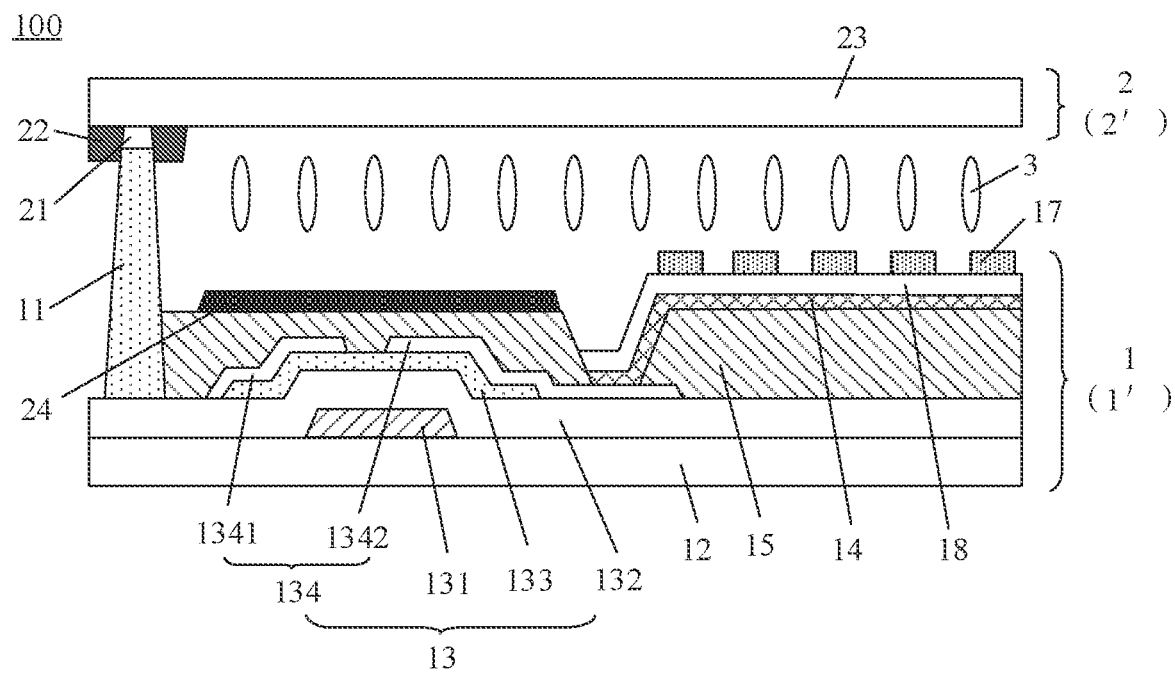
FIG. 9 is a partial cross-sectional view showing a structure of another liquid crystal display panel, according to some embodiments of the present disclosure.
Figure 10:
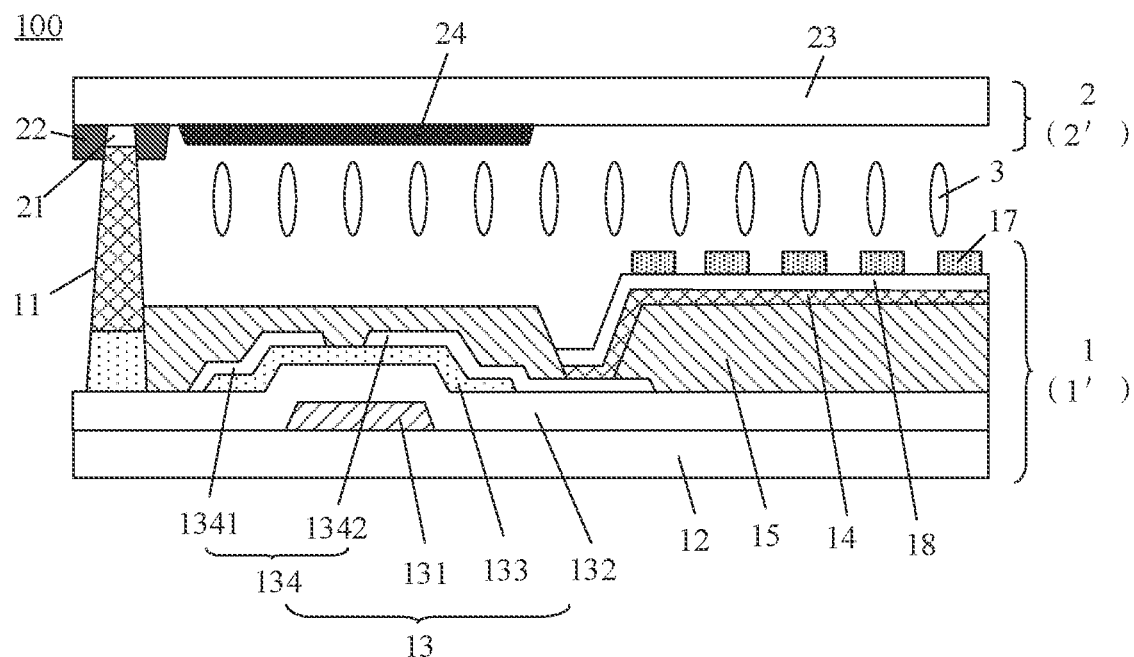
FIG. 10 is a partial cross-sectional view showing a structure of yet another liquid crystal display panel, according to some embodiments of the present disclosure.

For example, as shown in FIG. 8, the protrusion 11 has a structure including one film, and the protrusion 11 is in the pixel electrode layer 14. For example, as shown in FIG. 9, the protrusion 11 has a structure including one film, and the protrusion 11 is in the active layer 133 of the pixel circuit structure 13. For example, as shown in FIG. 10, the protrusion 11 has a structure including two films, and one film is in the active layer 133 of the pixel circuit structure 13, the other film is in the pixel electrode layer 14. Of course, there are other arrangement manners for the structure of the protrusion 11, which is not limited thereto.

In some other embodiments, as shown in FIGS. 8 to 13, the array substrate 1' further includes: a color filter layer 15 disposed at a side of the pixel electrode layer 14 proximate to or away from the opposite substrate 2'. The color filter layer 15 includes color filter portions of at least two colors. For example, the color filter layer 15 includes a filter portion of red color and a filter portion of green color; or, the color filter layer 15 includes a filter portion of red color, a filter portion of green color and a filter portion of blue color; or, the color filter layer 15 includes a filter portion of red color, a filter portion of green color, a filter portion of blue color and a filter portion of white color; etc.

In some examples, as shown in FIGS. 8 to 11, the color filter layer 15 is disposed at a side of the pixel electrode layer 14 away from the opposite substrate 2', that is, the color filter layer 15 is disposed in the array substrate 1'. In this case, the array substrate 1' may also be referred to as a color filter on array (COA) substrate. By providing the color filter layer 15 in the array substrate 1', not only may an aperture ratio of the liquid crystal display panel 100 be increased to increase a display brightness of the liquid crystal display panel 100, but also a problem of low alignment accuracy due to a fact that the pixel circuit structure 13 and the color filter layer 15 are disposed in different base substrates may be avoided.

Figure 12:
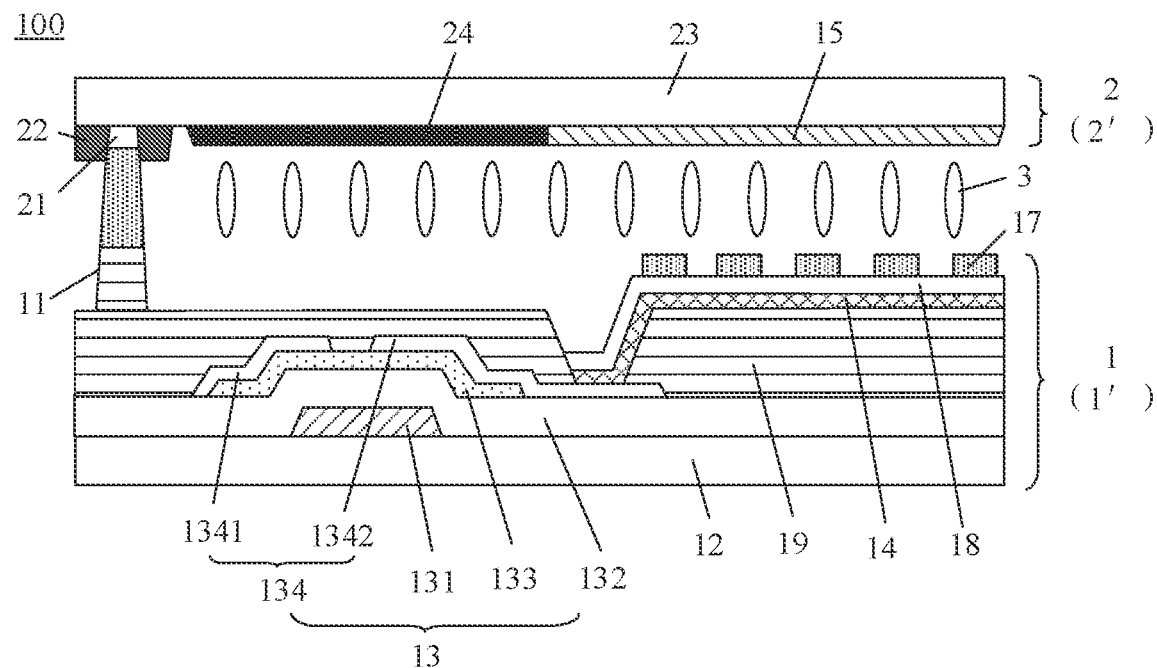
FIG. 12 is a partial cross-sectional view showing a structure of yet another liquid crystal display panel, according to some embodiments of the present disclosure.
Figure 13:
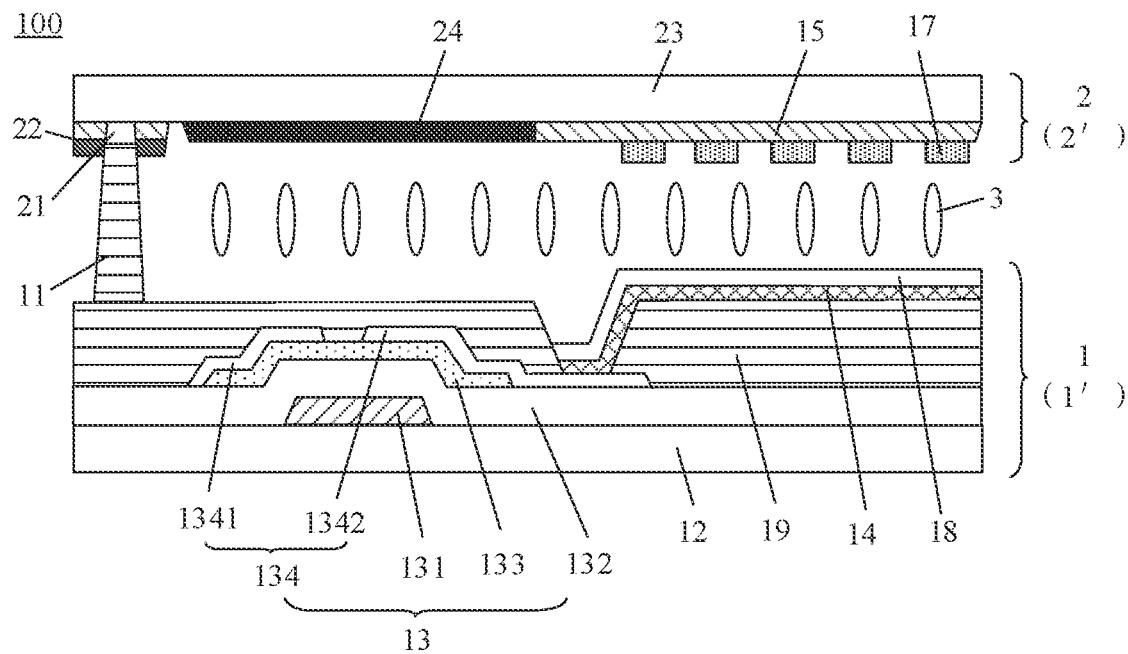
FIG. 13 is a partial cross-sectional view showing a structure of yet another liquid crystal display panel, according to some embodiments of the present disclosure.

In some other examples, the color filter layer 15 is disposed at a side of the pixel electrode layer 14 proximate to the opposite substrate 2'. There are a variety of arrangement positions of the color filter layer 15. For example, the color filter layer 15 is disposed in the array substrate 1'. For another example, as shown in FIGS. 12 and 13, the color filter layer 15 is disposed in the opposite substrate 2'. In this case, the opposite substrate 2' may also be referred to as a color film substrate. By providing the color filter layer 15 in the opposite substrate 2', it is possible to avoid adverse effects on the pixel circuit structure 13 in a process of manufacturing the color filter layer 15.

Herein, in a case where the color filter layer 15 is disposed in the array substrate 1', the structure of the protrusion 11 is, for example, a structure in which a film of the at least one film included in the protrusion 11 is in a color filter portion of a color among the color filter portions of at least two colors.

For example, the color filter layer 15 includes at least a filter portion of red color, the protrusion 11 has a structure including one film, and the protrusion 11 is in the filter portion of red color.

Figure 11:
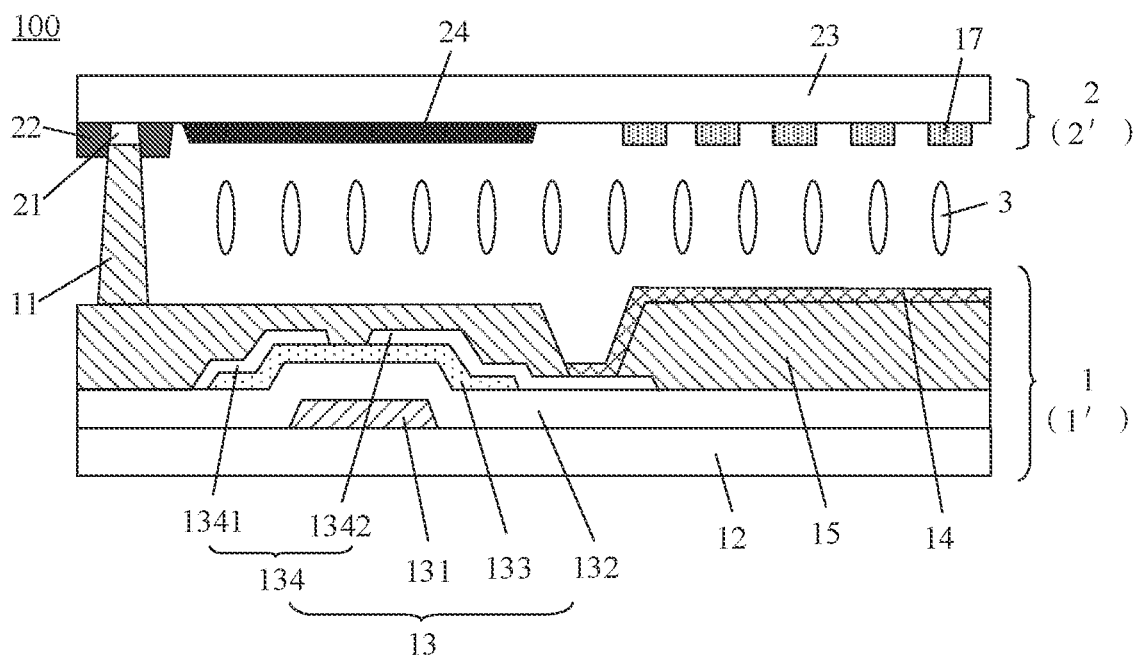
FIG. 11 is a partial cross-sectional view showing a structure of yet another liquid crystal display panel, according to some embodiments of the present disclosure.

For example, as shown in FIG. 11, the color filter layer 15 in FIG. 11 includes a filter portion of blue color, the protrusion 11 has a structure including one film, and the protrusion 11 is in the blue color filter portion. Of course, in a case where the protrusion 11 has a structure including one film, the protrusion 11 may also be in one layer of the pixel circuit structure 13 or in the pixel electrode layer 14. Since the filter portion of blue color absorbs more light, by providing the protrusion 11 and the blue color filter portion in the same layer, it is beneficial to prevent light in the display region A1 of the liquid crystal display panel 100 from exiting through the non-display region A2, thereby avoiding a phenomenon of light leak at an edge of the liquid crystal display panel 100.

For example, the protrusion 11 has a structure including a plurality of films disposed in a stack, and any film of the plurality of films is in a color filter portion of one color among the color filter portions of at least two colors. The other film(s) of the plurality of films may be in other layer(s) in the array substrate 1'. For example, one film of the other film(s) in the protrusion 11 is in the active layer 133.

By providing a film of the at least one film included in the protrusion 11 in a color filter portion of one color among the color filter portions of at least two colors, the protrusions 11 may be formed simultaneously as the manufacturing of a plurality of films in the display region A1. In this way, on the one hand, the manufacturing process of the liquid crystal display panel 100 may be simplified; on the other hand, the manufacturing efficiency of the liquid crystal display panel 100 may be improved.

In some examples, in a case where the color filter layer 15 is disposed in the array substrate 1', a dimension of the protrusion 11 in a direction from the array substrate 1' to the opposite substrate 2' is less than or equal to a dimension of the color filter layer 15 in the direction from the array substrate 1' to the opposite substrate 2'. Here, the dimension of the color filter layer 15 in the direction from the array substrate 1' to the opposite substrate 2', for example, is that an average dimension of the plurality of color filter portions included in the color filter layer 15, or a minimum dimension of the plurality of color filter portions included in the color filter layer 15 in the direction from the array substrate 1' to the opposite substrate 2'. By setting the dimension of the protrusion 11 and the dimension of the color filter layer 15, it is possible to avoid a situation where a spacing between a middle of the first substrate 1 and a middle of the second substrate 2 is less than a spacing between an edge of the first substrate 1 and an edge of the second substrate 2, and thus it is possible to avoid a phenomenon of display defect at the periphery of the liquid crystal display panel 100.

Figure 14:
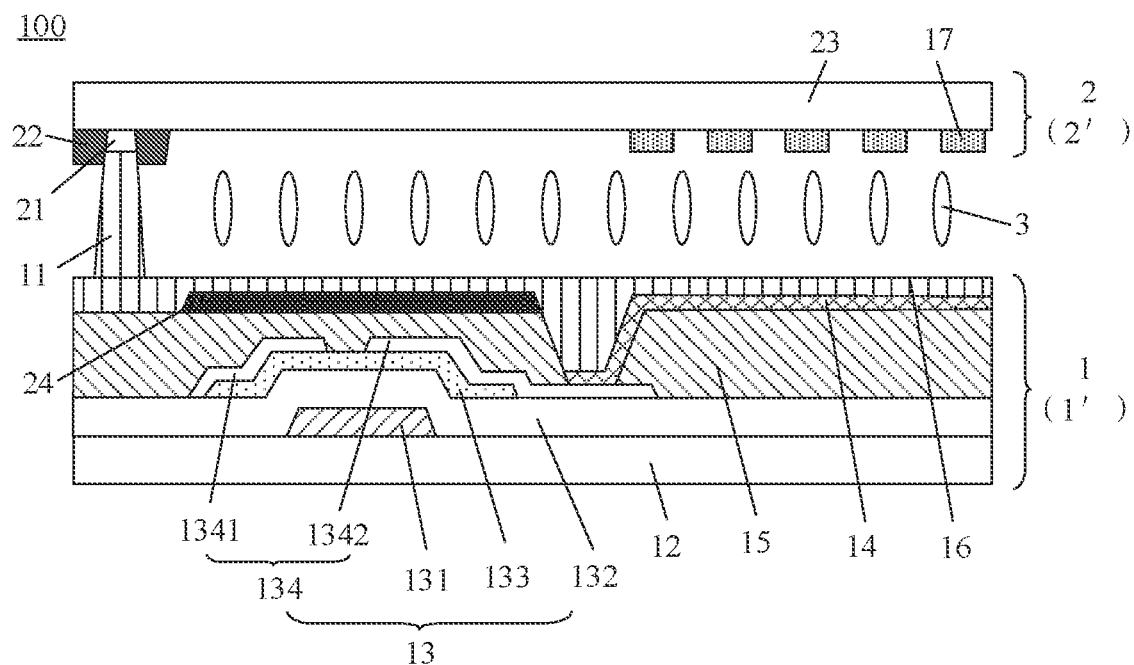
FIG. 14 is a partial cross-sectional view showing a structure of yet another liquid crystal display panel, according to some embodiments of the present disclosure.
Figure 15:
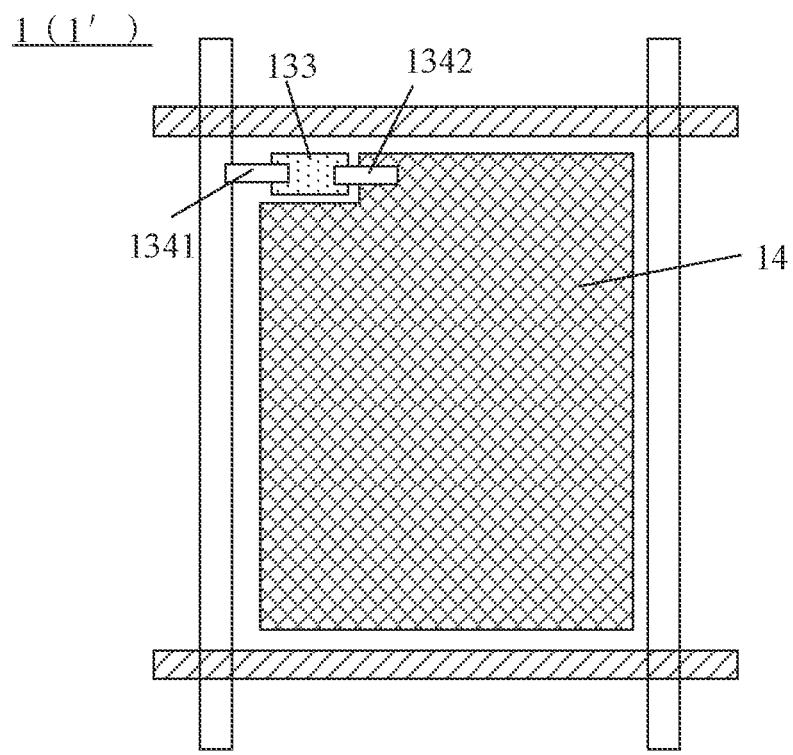
FIG. 15 is a partial top view showing a structure of an array substrate, according to some embodiments of the present disclosure.

In some other embodiments, as shown in FIG. 14, the array substrate 1' further includes an over coat (OC) layer 16 disposed on a side of the pixel electrode layer 14 proximate to the opposite substrate 2'. In this case, the array substrate 1' includes the color filter layer 15; or the opposite substrate 2' includes the color filter layer 15. In a case where the array substrate 1' includes the color filter layer 15, the OC layer 16 is disposed at a side of the color filter layer 15 away from the first base substrate 12.

Here, the structure of the protrusion 11 is, for example, a structure in which a film of the at least one film included in the protrusion 11 is in the OC layer 16.

For example, as shown in FIG. 14, the protrusion 11 has a structure including one film, and the protrusion 11 is in the OC layer 16. In this way, the protrusions 11 may be manufactured simultaneously as the OC layer 16. On the one hand, the manufacturing process of the liquid crystal display panel 100 may be simplified; on the other hand, the manufacturing efficiency of the liquid crystal display panel 100 may be improved.

For example, the protrusion 11 has a structure including a plurality of films disposed in a stack, and a film of the plurality of films is in the OC layer 16, The other film(s) of the plurality of films may be in other layer(s) in the array substrate 1'. For example, one film of the other films in the protrusion 11 is in one layer of the pixel circuit structure 13.

In some other embodiments, as shown in FIGS. 12 and 13, the array substrate 1' further includes a passivation layer 19 disposed on a side of the pixel circuit structure 13 away from the first base substrate 12. A position relationship between the passivation layer 19 and the pixel electrode layer 14 is a position relationship, for example, as shown in FIGS. 12 and 13, where the passivation layer 19 is disposed on a side of the pixel electrode layer 14 away from the opposite substrate 2", and the pixel electrode layer 14 is electrically connected to the drain electrode 1342 in the pixel circuit structure 13 through a via hole in the passivation layer 19.

Herein, the structure of the protrusion 11 is, for example, a structure in which a film of the at least one film included in the protrusion 11 is in the passivation layer 19.

For example, as shown in FIG. 13, the protrusion 11 has a structure including one film, and the protrusion 11 is in the passivation layer 19.

For example, as shown in FIG. 12, the protrusion 11 has a structure including a plurality of films disposed in a stack, one film of the plurality of films is in the passivation layer 19, and the other film(s) of the plurality of films are in other layer(s) in the array substrate 1'.

In some other embodiments, as shown in FIGS. 9, 10 and 12, the array substrate 1' further includes a common electrode layer 17 disposed at a side of the pixel electrode layer 14 proximate to the opposite substrate 2'. An insulating layer 18 is provided between the common electrode layer 17 and the pixel electrode layer 14. In this case, the common electrode layer 17 includes block electrodes, and each block electrode is, for example, a slit electrode; correspondingly, the pixel electrode layer 14 includes a plurality of block electrodes.

In addition, the common electrode layer 17 may be disposed at a side of the pixel electrode layer 14 away from the opposite substrate 2'. In this case, the common electrode layer 17 includes a plurality of block electrodes, and correspondingly, the pixel electrode layer 14 includes a plurality of block electrodes, and each block electrode is a slit electrode. Or, the common electrode layer 17 may be disposed in the same layer as the pixel electrode layer 14. In this case, both the common electrode layer 17 and the pixel electrode layer 14 include a plurality of block electrodes, each block electrode has a comb-shape, and each block electrode in the common electrode layer 17 is corresponding to one block electrode in the pixel electrode layer 14.

In a case where the common electrode layer 17 and the pixel electrode layer 14 are disposed in the same layer, an electric field such as a horizontal electric field or a fringe electric field may be generated between the common electrode layer 17 and the pixel electrode layer 14, and liquid crystal molecules may be driven to rotate by the electric field. Since the common electrode layer 17 and the pixel electrode layer 14 are disposed in the same layer, the common electrode layer 17 and the pixel electrode layer 14 may be simultaneously formed in a single patterning process by using one mask. In this way, the number of masks and the number of times of manufacturing film layers may not increase without affecting the driving voltage of the liquid crystal display panel 100, so as to reduce the manufacturing cost of the liquid crystal display panel 100.

By providing the common electrode layer 17, the common electrode layer 17 and the pixel electrode layer 14 may cooperate with each other to drive the liquid crystal molecules in the liquid crystal layer 3 to rotate, thereby controlling gray scales of each sub-pixel in the liquid crystal display panel 100.

Herein, the structure of the protrusion 11 is, for example, a structure in which a film of the at least one film included in the protrusion 11 is in the common electrode layer 17.

For example, the protrusion 11 has a structure including one film, and the protrusion 11 is in the common electrode layer 17.

For example, the protrusion 11 has a structure including a plurality of films disposed in a stack, one film of the plurality of films is in the common electrode layer 17, and the other film(s) of the plurality of films may be in other layer(s) in the array substrate 1'. For example, as shown in FIG. 12, one film of the other films in the protrusion 11 is in the passivation layer 19 in the pixel circuit structure 13.

In some examples, as shown in FIG. 8, the common electrode layer 17 may also be disposed in the opposite substrate 2'. In this case, a vertical electric field may be generated between the common electrode layer 17 and the pixel electrode layer 14, so that the liquid crystal molecules may be driven to rotate by utilizing the vertical electric field without affecting a driving voltage of the display panel 100, thereby realizing control of gray scales of each sub-pixel in the liquid crystal display panel 100. In this case, the common electrode layer 17 may include a plurality of block electrodes (each block electrode is, for example, a slit electrode), or may include a planar electrode.

In some other examples of the present disclosure, a structure of the groove 21 is a structure including at least one film. The structure of the groove 21 will be illustrated below by taking an example in which the opposite substrate 2' is provided with a plurality of grooves 21.

In some embodiments, as shown in FIGS. 8 to 14, the opposite substrate 2' includes a second base substrate 23 and a first black matrix pattern 22 that is disposed at a side of the second base substrate 23 proximate to the array substrate 1' in the non-display region(s) A2. At least one part of the first black matrix pattern 22 forms the plurality of grooves 21.

Herein, at least one part of the first black matrix pattern 22 forms the plurality of grooves 21, which includes: as shown in FIGS. 4 to 6, a part of the first black matrix pattern 22 forms the plurality of grooves 21; or, as shown in FIGS. 2, 3 and 7, all parts of the first black matrix pattern 22 form the plurality of grooves 21.

The first black matrix pattern 22 has a certain thickness (i.e., a dimension of the first black matrix pattern 22 in a direction from the array substrate 1' direct to the opposite substrate 2'), so that the groove 21 has a certain depth (i.e., a dimension of the groove 21 in the direction from the array substrate 1' direct to the opposite substrate 2'), and it is ensured that a misalignment between the array substrate 1' and the opposite substrate 2' paired with each other during use may be avoided after the protrusion 11 is inserted into the corresponding groove 21.

By using the first black matrix pattern 22 capable of blocking light to form the groove 21, not only may the groove 21 be matched with the protrusion 11 in the array substrate 1' to prevent the array substrate 1' and the opposite substrate 2' from being misaligned, but also light in the display region A1 of the liquid crystal display panel 100 may be prevented from exiting through the non-display region A2 by utilizing light blocking effect of the first black matrix pattern 22, that is, a phenomenon of light leak in the non-display region A2 of the liquid crystal display panel 100 may be avoided.

In the embodiments of the present disclosure, the film for forming the plurality of grooves 21 includes but is not limited to the first black matrix pattern 22.

For example, as shown in FIG. 13, in a case where the opposite substrate 2' includes the color filter layer 15 disposed on the second base substrate 23, and the color filter layer 15 includes color filter portions of at least two colors, the plurality of groove 21 may be disposed in a color filter portion of one color among the color filter portions of at least two colors.

For example, in a case where the opposite substrate 2' includes the OC layer 16, the OC layer 16 may be formed in the non-display region A2 to form the grooves 21 by using a part of the OC layer 16 in the non-display region A2.

In the embodiment of the present disclosure, as shown in FIGS. 8 to 14, the liquid crystal display panel 100 further includes a second black matrix pattern 24 disposed in the display region A1. Arrangement positions of the second black matrix pattern 24 may be various, which is not limited in this embodiment.

In some examples, as shown in FIGS. 8 and 9, the second black matrix pattern 24 is disposed in the array substrate 1' and disposed at a side of the pixel circuit structure 13 away from the first base substrate 12. An orthographic projection of the pixel circuit structure 13 on the first base substrate 12 is within a range of an orthographic projection of the second black matrix pattern 24 on the first base substrate 12.

In some other examples, as shown in FIGS. 10 and 11, the second black matrix pattern 24 is disposed in the opposite substrate 2' and disposed on a side of the second base substrate 23 proximate to the array substrate 1'. The orthographic projection of the pixel circuit structure 13 on the first base substrate 12 is within the range of the orthographic projection of the second black matrix pattern 24 on the first base substrate 12.

It will be noted that, in a case where the second black matrix pattern 24 is disposed in the opposite substrate 2', the first black matrix pattern 22 and the second black matrix pattern 24 may be disposed in the same layer.

A manufacturing process of the liquid crystal display panel 100 is not limited in the present disclosure, that is, a manufacturing process of the array substrate 1' and a manufacturing process of the opposite substrate 2' are not limited.

The manufacturing process of the array substrate 1' will be illustrated below by taking the array substrate 1' using the COA technology as an example.

As shown in FIG. 8, a gate electrode layer 131 and a plurality of gate lines disposed in the same layer as the gate electrode layer 131 are formed on the first base substrate 12. Then, a gate insulating layer 132 is formed on a side of the gate electrode layer 131 and the plurality of gate lines away from the first base substrate 12. Thereafter, an active layer 133 is formed on a side of the gate insulating layer 132 away from the first base substrate 12. Next, a source-drain electrode layer 134 is formed on a side of the active layer 133 away from the first base substrate 12, and the source-drain electrode layer 134 includes source electrode(s) 1341, drain electrode(s) 1342 and a plurality of data lines disposed in the same layer. The source electrode 1341 and the drain electrode 1342 are in electrical contact with the active layer 133, and the plurality of data lines and the plurality of gate lines cross each other. After that, a color filter layer 15 is formed on a side of the source-drain electrode layer 134 away from the first base substrate 12. Thereafter, a pixel electrode layer 14 is formed on a side of the color filter layer 15 away from the first base substrate 12.

Some embodiments of the present disclosure provide an array substrate 1'. As shown in FIGS. 8 to 14, the array substrate 1' is the first substrate 1 or the second substrate 2 provided in some embodiments described above.

Some embodiments of the present disclosure provide an opposite substrate 2'. As shown in FIGS. 8 to 14, the opposite substrate 2' is the second substrate 2 or the first substrate 1 provided in some embodiments described above.

The array substrate 1' and the opposite substrate 2' are provided correspondingly. In some examples, in a case where the first substrate 1 is the array substrate 1', the second substrate 2 is the opposite substrate 2'. In some other examples, in a case where the second substrate 2 is the array substrate 1', the first substrate 1 is the opposite substrate 2'.

In addition, one of the array substrate 1' and the opposite substrate 2' includes a plurality of protrusions 11, and the other of the array substrate 1' and the opposite substrate 2' includes a plurality of grooves 21.

For example, the array substrate 1' includes a plurality of protrusions 11, and the opposite substrate 2' includes a plurality of grooves 21. In the process of aligning the array substrate 1' and the opposite substrate 2' to form the liquid crystal display panel 100, the fits between the plurality of protrusions 11 and the plurality of grooves 21 may be utilized to perform alignment to improve the fit between the array substrate 1' and the opposite substrate 2', thereby improving the product yield of the liquid crystal display panel 100.

Figure 16:
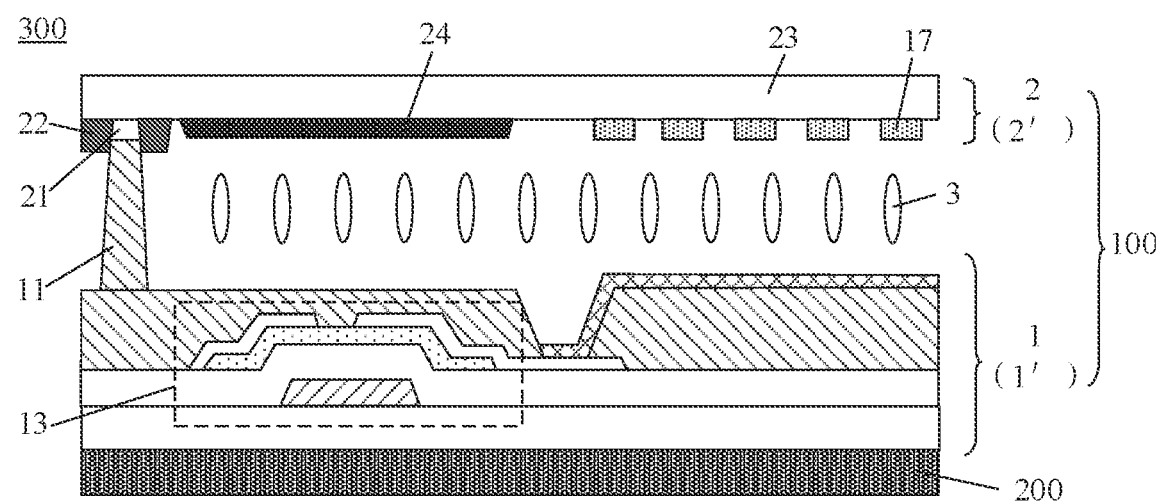
FIG. 16 is a partial cross-sectional view showing a structure of a liquid crystal display device, according to some embodiments of the present disclosure.

Some embodiments of the present disclosure provide a liquid crystal display device 300. As shown in FIG. 16, the liquid crystal display device 300 includes the liquid crystal display panel 100 as provided in some embodiments described above, and a backlight module 200 disposed at a side of the liquid crystal display panel 100. The backlight module 200 is configured to provide light for the liquid crystal display panel 100.

Herein, the backlight module 200 includes but is not limited to a backlight.

There are various types of the backlight module 200. For example, the backlight module 200 is a back-lit backlight module, and in this case, the backlight module 200 further includes a diffusion plate, an optical film, etc. For example, the backlight module 200 is an edge-lit backlight module, and in this case, the backlight module 200 further includes a light guide plate, a diffusion sheet, etc.

The liquid crystal display panel 100 included in the liquid crystal display device 300 has the same structure and beneficial effects as the liquid crystal display panel 100 provided in some embodiments described above, and since the structure and beneficial effects of the liquid crystal display panel 100 have been described in detail in some embodiments described above, which will not be described herein again.

In some embodiments, the liquid crystal display device 300 may be any device that displays images whether moving (e.g., videos) or stationary (e.g., still images), and whether literal or graphical. More specifically, it is contemplated that the embodiments may be implemented in or associated with a variety of electronic devices such as (but not limit to) mobile telephones, wireless devices, personal digital assistants (FDA), hand-held or portable computers, global positioning system (GPS) receivers/navigators, cameras, moving picture experts group 4 (MP4) video players, video cameras, game consoles, watches, clocks, calculators, TV monitors, flat panel displays, computer monitors, car displays (e.g., odometer displays, etc.), navigators, cockpit controllers and/or displays, displays for camera view (e.g., displays for rear view cameras in vehicles), electronic photos, electronic billboards or signs, projectors, building structures, packaging and aesthetic structures (e.g., a display for an image of a piece of jewelry), etc.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. A liquid crystal display panel, comprising an array substrate and an opposite substrate that are disposed opposite to each other; the liquid crystal display panel having a display region and at least one non-display region disposed beside the display region; the liquid crystal display panel further comprising a sealant disposed between the array substrate and the opposite substrate in the at least one non-display region; wherein
the array substrate is of a multi-layer structure and includes a pixel electrode layer and a plurality of protrusions disposed in the at least one non-display region, the opposite substrate includes a common electrode layer whose boundaries are disposed within the display region; a protrusion has a structure including at least one film, and a film of the at least one film is located in a layer included in the array substrate;
the opposite substrate further includes a plurality of grooves disposed in the at least one non-display region; each protrusion of the plurality of protrusions is corresponding to a groove of the plurality of grooves, and the protrusion is matched with the corresponding groove;
a shape of an end face of the protrusion proximate to the corresponding groove is the same as a shape of an opening of the corresponding groove proximate to the protrusion, and an area of the end face of the protrusion proximate to the corresponding groove is slightly greater than an area of the opening of the corresponding groove proximate to the protrusion; and
the plurality of protrusions are disposed at a side of the sealant proximate to the display region.

2. The liquid crystal display panel according to claim 1, wherein a shape of the protrusion includes at least one of a cylindrical, a frustum of a cone, a prism or a frustum of a pyramid.

3. The liquid crystal display panel according to claim 2, wherein shapes of the plurality of protrusions are the same or not completely the same.

4. The liquid crystal display panel according to claim 1, wherein the film of the at least one film is located in the pixel electrode layer.

5. The liquid crystal display panel according to claim 1, wherein the array substrate further includes a pixel circuit structure disposed on a side of the pixel electrode layer away from the opposite substrate, the pixel circuit structure includes a gate electrode layer, a gate insulating layer, an active layer and a source-drain electrode layer; and
the film of the at least one film is located in a layer of the pixel circuit structure.

6. The liquid crystal display panel according to claim 1, wherein the array substrate further includes a pixel circuit structure disposed on a side of the pixel electrode layer away from the opposite substrate, the pixel circuit structure includes a gate electrode layer, a gate insulating layer, an active layer and a source-drain electrode layer; and
the protrusion has a structure including two films, and a layer of the two films is located in the active layer, and another layer of the two films is located in the pixel electrode layer.

7. The liquid crystal display panel according to claim 1, wherein the array substrate further includes a color filter layer disposed at a side of the pixel electrode layer proximate to or away from the opposite substrate, the color filter layer includes color filter portions of at least two colors; and
the film of the at least one film is located in a color filter portion of a color among the color filter portions of at least two colors.

8. The liquid crystal display panel according to claim 7, wherein the color filter portions of at least two colors includes at least a color filter portion of red color, and the film of the at least one film is located in the color filter portion of red color.

9. The liquid crystal display panel according to claim 7, wherein a dimension of the protrusion in a direction from the array substrate to the opposite substrate is less than or equal to a dimension of the color filter layer in the direction from the array substrate to the opposite substrate.

10. The liquid crystal display panel according to claim 1, wherein the plurality of protrusions are disposed in the at least one non-display region corresponding to one edge or more edges of the liquid crystal display panel.

11. The liquid crystal display panel according to claim 1, wherein in the plurality of protrusions, shapes of protrusions in a non-display region corresponding to a same edge of the liquid crystal display panel are not completely the same; and/or
shapes of protrusions in non-display regions corresponding to different edges of the liquid crystal display panel are not completely the same.

12. The liquid crystal display panel according to claim 1, wherein in the plurality of protrusions, protrusions in a non-display region corresponding to an edge of the liquid crystal display panel are arranged in at least one row; and
protrusions in each row of the at least one row are sequentially arranged in an extending direction of the edge of the liquid crystal display panel corresponding to the non-display region in which the protrusions are disposed.

13. The liquid crystal display panel according to claim 1, wherein a minimum distance between the protrusion and a boundary of the display region closest to the protrusion is greater than or equal to 5 µm.

14. The liquid crystal display panel according to claim 1, wherein the array substrate further includes an over coat layer disposed on a side of the pixel electrode layer proximate to the opposite substrate;
the film of the at least one film is located in the over coat layer.

15. The liquid crystal display panel according to claim 1, wherein the opposite substrate further includes a second base substrate and a first black matrix pattern disposed at a side of the second base substrate proximate to the array substrate in the at least one non-display region; and
at least one part of the first black matrix pattern forms the plurality of grooves.

16. The liquid crystal display panel according to claim 1, wherein the opposite substrate further includes a second base substrate and a color filter layer disposed on a side of the second base substrate proximate to the array substrate, and the color filter layer includes color filter portions of at least two colors; and
the plurality of grooves are located in a color filter portion of a color among the color filter portions of at least two colors.

17. A liquid crystal display device, comprising:
the liquid crystal display panel according to claim 1; and
a backlight module configured to provide light for the liquid crystal display panel.

* * * * *